US006433975B1

(12) United States Patent
Satoh et al.

(10) Patent No.: US 6,433,975 B1
(45) Date of Patent: Aug. 13, 2002

(54) MOTOR PROTECTOR APPARATUS

(75) Inventors: Tatsuhiko Satoh; Takashi Masuda, both of Susono; Mitsuru Unno, Mishima, all of (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/421,911

(22) Filed: Oct. 20, 1999

(30) Foreign Application Priority Data

Nov. 7, 1998 (JP) .......................................... 10-327016

(51) Int. Cl.[7] .................................................. H02H 5/04
(52) U.S. Cl. ......................................................... 361/23
(58) Field of Search ............................ 361/22, 24, 23, 361/103, 115, 26; 337/76, 74, 77, 107, 113, 112, 380; 200/1 R, 405, DIG. 42

(56) References Cited

U.S. PATENT DOCUMENTS

| | | | | |
|---|---|---|---|---|
| 4,400,677 A | | 8/1983 | Cobb, III et al. | |
| 4,443,780 A | * | 4/1984 | Huai-Chieh | 337/257 |
| 4,458,231 A | * | 7/1984 | Sensor | 337/107 |
| 4,647,727 A | * | 3/1987 | Sontheimer | 200/1 R |
| 4,782,318 A | * | 11/1988 | Boulanger | 337/380 |
| 5,015,985 A | * | 5/1991 | Ubukata et al. | 337/368 |
| 5,903,418 A | * | 5/1999 | Boivin et al. | 361/22 |
| 5,995,351 A | * | 11/1999 | Katsumata et al. | 361/105 |

* cited by examiner

*Primary Examiner*—Brian Sircus
*Assistant Examiner*—J. F. Duverne
(74) *Attorney, Agent, or Firm*—Russell E. Baumann; Frederick J. Telecky, Jr.

(57) ABSTRACT

In a sealed casing (2) there are provided a bimetal disc (8) which carries out the switching of an electric current path by snapping between oppositely dished configurations in conformity with the level of the electric current that flows therethrough and ambient temperature by moving a movable contact (10) into and out of the electric current path. A fuse terminal (14, 15, 141, 142, 143, 144) is connected in series with the bimetal disc (8) and shuts off the current path by being melted by an over-current. The fuse terminal (14) in one embodiment is fixed on one surface of a support member (3) that serves as a heater. The fuse terminal (14) and the bimetal disc (8) are connected through a connective pin (12) which is provided through the support member (3) electrically insulated therefrom. In another embodiment the bimetal disc (8) and the fuse terminal (15) are disposed on opposite face surfaces of support member (3).

20 Claims, 6 Drawing Sheets

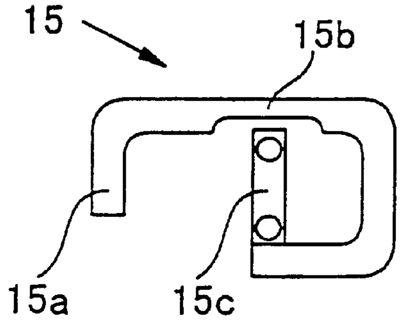
FIG 5(a)
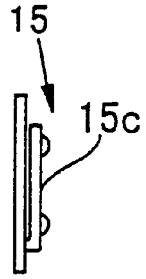
FIG 5(b)
FIG 6(a)
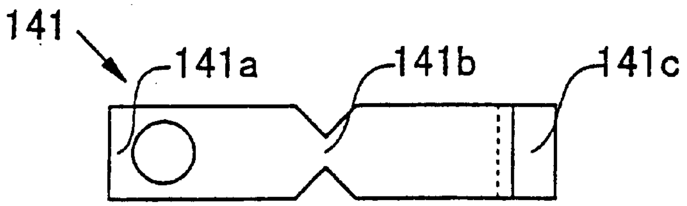
FIG 6(b)
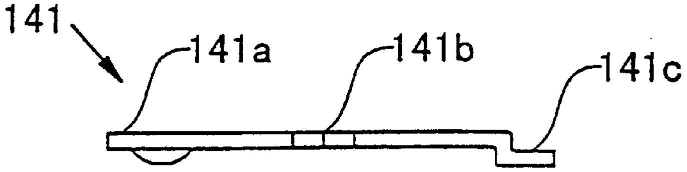
FIG 7(a)
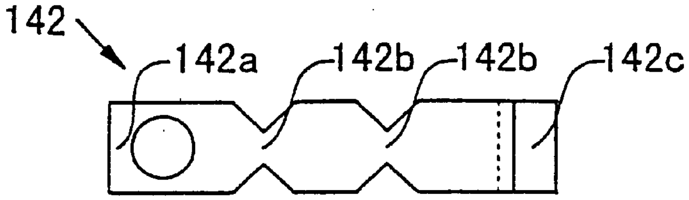
FIG 7(b)
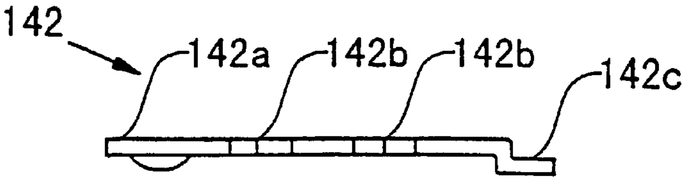

MOTOR PROTECTOR APPARATUS

FIELD OF THE INVENTION

This invention relates generally to a motor protector which is to be used in a compressor or the like to be employed, for instance, in air conditioners, and more particularly to a motor protector of the type to be used inside of the motor that is to be protected.

BACKGROUND OF THE INVENTION

Examples of prior art motor protectors of this type are shown in FIGS. 9(*a*) through 9(*c*). As shown in FIGS. 9(*a*) and 9(*b*), a typical motor protector 101 has a support 103 having a heater 103*a* disposed in the main body 102*a* of a casing 102 made of steel. A terminal pin 104 which has been fixed to the support member 103 extends out of a header 105 that has been provided at the opening of casing 102, with the gap between this terminal pin 104 and header 105 being sealed by a glass seal 106 and an epoxy pellet 107. A bimetal disc 108 is fixed to support member 103 by means of a slug 109, with its movable contact 110 engageable with a stationary contact 111 mounted inside of casing 102.

In applications in which a motor protector as described is to be installed in a motor compressor of the sealed type (hereafter referred to as the electromotive compressor 100), first and second electric wires 112 are connected respectively to terminal pin 104 and casing 102. Motor protector 101 is disposed inside of an insulating sleeve 113 and, as shown in FIG. 9(*c*), is connected to windings 114 (main winding 114*a* and auxiliary winding 114*b*). Thus, motor protector 101 is serially connected with driving circuit 130 of electromotive compressor 100 connectable to an alternating current source 115.

Bimetal disc 108 snaps from one dished configuration to an opposite dished configuration due to the generation of heat by the bimetal disc stemming from overload current or, otherwise, by an elevation of the ambient temperature within the protector including the generation of heat by heater 103*a*, with a consequence that the driving circuit is opened thereby preventing any possible damage from being inflicted on electromotive compressor 100.

Nevertheless, such conventional motor protectors 101 have the following problem:

In the event that an abnormal state, as described above, develops in electromotive compressor 100, electromotive compressor 100 is protected from heat generation or possible burning as the motor protector 101 repeatedly conducts and interrupts the electric current. In the case where the situation is not remedied, motor protector 101 continues its protection of electromotive compressor 100 above and beyond the designed number of cycles of its life expectancy. Under such circumstances, when motor protector 101 eventually exceeds its expected product life, melting and welding of movable contact 110 and stationary contact 111 of the bimetal disc 108 occur, thereby bringing about a state of continuous current flow. If such a state continues, winding 114 in electromotive compressor 100 will become overheated, with a result that the electrical insulating resin of winding 114 will be melted by the heat, thereby bringing about a short-circuited state. This results in a marked increase in electric current and concomitant lowering of the resistance value of the driving circuit 130, with a resultant abnormally heated state due to a large current flowing in the inner circuit of electromotive compressor 100. As a consequence of such abnormal heating, winding 114 of electromotive compressor 100 can be burned producing carbide soot which adheres to the surface of glass 106 of the fusite pin 104, thereby bringing about a loss of electrical insulation between the fusite pin 104 and header 105.

In the worst case, tracking develops on the surface of glass 106 causing the glass to soften and melt due to the heat generated by the passage of electric current, culminating in the blow-out of fusite pin 104 which is no longer able to withstand the inner pressure of electromotive compressor 100 in some cases. In order to cope with such a problem, it is conceivable to provide a fuse, for example, for the purpose of de-energizing driving circuit 130 prior to the possible blow-out of the fusite pin. In such case, there is also a concern that the arc that is generated in connection with the melting of the fuse could ignite the gas in the electromotive compressor 100, thereby causing a possible explosion.

SUMMARY OF THE INVENTION

An object of the present invention is to provide a motor protector which solves the problem of the prior art described above. Another object of the invention is the provision of a motor protector which is capable of ultimately avoiding a dangerous situation even in the case where the contacts of a motor protector weld. Yet another object of the invention is the provision of a motor protector which is capable of preventing any possible adverse affect of an arc, generated when the driving circuit has been interrupted, on the various environments of the electromotive compressor.

Briefly stated, a motor protector made in accordance with the invention comprises a casing that can be tightly sealed, a first switch provided inside the casing that carries out the switching of a movable contact in an electric path as a snap-acting disc snaps from one dished configuration to an opposite dished configuration in response to a selected level of electric current and the ambient temperature, and a second switch which is connected in series with the first switch inside of the casing and which opens the current path when it is melted by a predetermined overflow of electric current.

In cases where the contacts of the first switch melt and weld in the conductive state, a large electric current is generated. According to the invention, however, the second switch will melt, thereby de-energizing the motor. Therefore, it becomes possible to prevent the possible burning of the electromotive compressor of the sealed type and any damage from being inflicted on the sealing terminal of the protector, thereby making it possible to prevent the possible adhesive tracking of carbide to the vicinity of the sealing terminal. As a consequence of this, it becomes possible by means of the invention to prevent the possible melting of the glass portion as induced from the tracking phenomenon caused by the loss of electrical insulating characteristics of the glass seal and prevent any possible blow-out of the fusite pin caused by the loss of holding characteristic of the glass. Further, by means of the invention, there is no adverse affect on the various environments of the electromotive compressor of the sealed type by the arc generated upon melting of the second switch since the second switch is disposed in an air-tight casing.

According to a feature of the invention, a heater generates heat in dependence on the level of electric current that flows in the electric current path so that it is possible to elevate the atmospheric temperature inside the casing by the heat generated by the heater and to adjust the characteristics of the motor protector by suitably selecting the material of the heater and the temperature responsive characteristics. According to another feature of the invention, accurate adjustment of the characteristics of the protector is enhanced when the second switch also serves as a heater and when the first and second switches are connected via a connective member extending through the support member which serves as the heater. According to yet another feature of the invention, the heater can be used to satisfactorily generate heat by arranging the first and second switches to sandwich the support member, for example, thereby making it possible to easily adjust the characteristics as desired. The first switch can be supported on the support member and the second switch can be arranged on the opposite side of the support member relative to the first switch. According to an alternative feature of the invention, the second switch can be arranged on the same side of the support member as the first switch so that it becomes possible to easily maintain the distance between the second switch and the inner wall of the casing, thereby making it possible to expand design flexibility and, at the same time, to accurately prevent a possible short-circuiting after the melting. According to yet another feature, the second switch as described above, can have a meltable portion that has been formed by reducing the cross-sectional area forming a meltable part which has a large electric resistance which melts when a selected level of electric current flows therethrough. In this case, it becomes easily possible to form the meltable portion of the second switch by providing a notch cut on the sides of the plate member. In addition, the second switch can have a plurality of meltable parts formed at prescribed locations to obtain motor protectors of various characteristics, with different melting temperatures, with the meltable parts provided in conformity with the motor to be protected, as the melting characteristics will change when a plurality of meltable parts are provided. According to a feature of the invention, the second switch can be constructed employing a cylindrical member to easily prepare the second switch and minimize the cost of metal molds and materials and which allows having the meltable parts comprise fusing material being formed and cut at a desired location and, at the same time, to obtain motor protectors of various properties by changing the size of the electric current that flows to the meltable part.

BRIEF DESCRIPTION OF THE DRAWINGS

Other objects, advantages and details of the novel and improved motor protector of the invention appear in the following detailed description of preferred embodiments of the invention, the detailed description referring to the drawings in which:

FIG. 1(*b*) is a partial cross-sectional bottom plan view showing the inner construction of the FIG. 1(*a*) motor protector;

FIG. 1(*c*) is a cross-sectional view taken on line A—A of FIG. 1(*b*);

FIG. 1(*d*) is a schematic circuit diagram showing a motor driving circuit to which the invention applies and a motor protector made according to the first embodiment;

FIG. 2(*b*) is a bottom plan view including a cross-section taken along line B—B in FIG. 2(*a*);

FIG. 3(*b*) is a bottom plan view showing the FIG. 3(*a*) fuse terminal;

FIG. 4(*b*) is a cross-sectional top plan view showing the inner construction of the FIG. 4(*a*) motor protector;

FIG. 4(*c*) is a cross-sectional view taken along line B—B in FIG. 4(*b*);

FIG. 5(*a*) is a front elevational view showing a fuse terminal used in the second embodiment of the invention;

FIG. 5(*b*) is a right side view of the FIG. 5 fuse terminal;

FIG. 6(*a*) is a front elevational view showing another embodiment of a fuse terminal which can be used in the invention;

FIG. 6(*b*) is a bottom plan view showing the FIG. 6(*a*) fuse terminal;

FIG. 7(*a*) is a front elevational view showing still another embodiment of a fuse terminal which can be used in the invention;

FIG. 7(*b*) is a top plan view showing the FIG. 7(*a*) fuse terminal;

FIG. 8(*b*) is a partial cross-section showing still another embodiment of a fuse terminal which can be used in the invention;

FIG. 9(*b*) is a cross-sectional top plan view of the FIG. 9(*a*) motor protector; and FIG. 9(*c*) is a schematic circuit diagram of a motor driving circuit and motor protector made according to the prior art.

DETAILED DESCRIPTION OF THE PREFERRED EMBODIMENTS

Figure 1A:
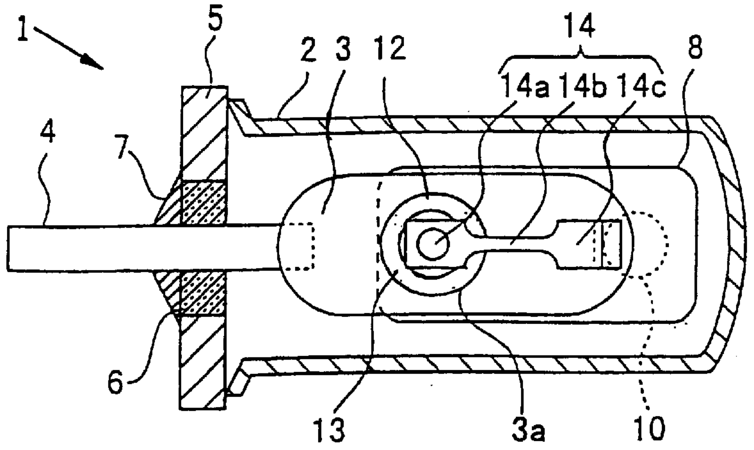
FIG. 1(*a*) is a cross-sectional front elevational view showing the inner construction of a motor protector made in accordance with the first embodiment of the invention.
Figure 1B:
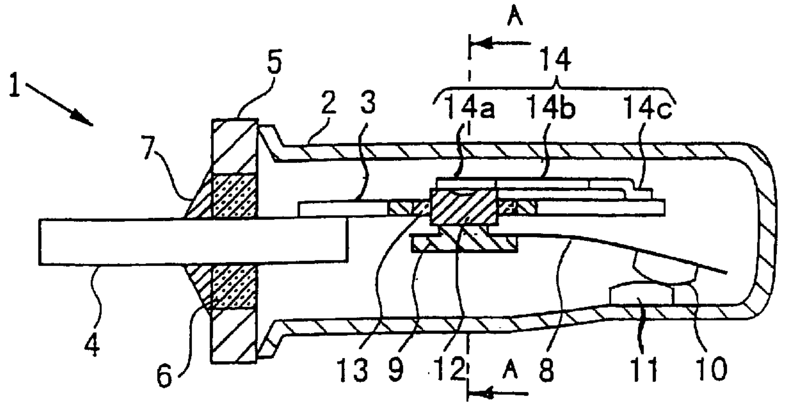
Figure 1C:
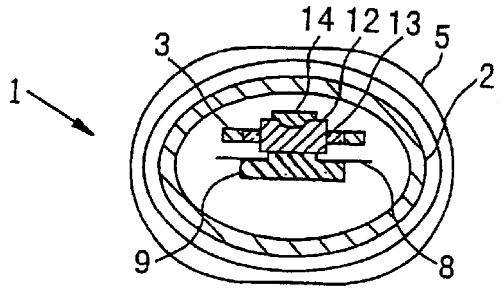
Figure 1D:
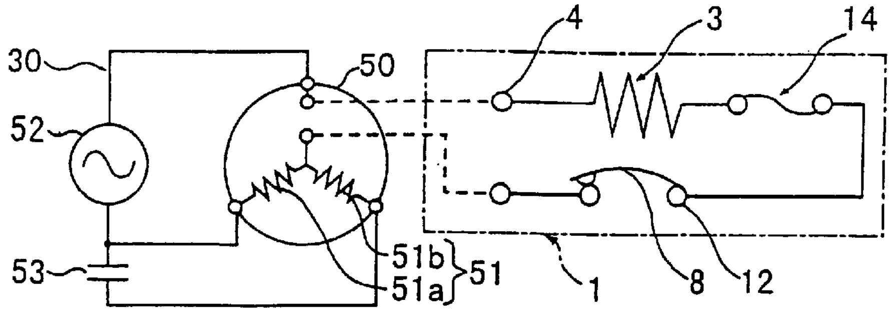

Preferred embodiments of the motor protector made according to the invention will be explained in detail below with reference to the accompanying drawings.

With reference to FIGS. 1(*a*) through 1(*d*), 2(*a*), 2(*b*), 3(*a*) and 3(*b*), a motor protector 1 made in accordance with the first embodiment comprises a plate like support member 3 having opposed face surfaces lying in respective planes which also functions as a heater and is accordingly composed of a metal of high electrical resistance, such as iron. Support member 3 is disposed inside a tubular casing 2 of suitable material such as steel having an open end. At one end of support member 3, a terminal pin 4, made of a stainless steel pin having a core of copper, for example, is fixed for connection with external circuits. A header 5 made of a steel plate is installed, as by welding, at the open end of casing 2 in electrical engagement therewith. Terminal pin 4 extends outwardly beyond header 5 and has an opposite distal end disposed within casing 2. The annular gap between terminal pin 4 and header 5 is sealed by means of a glass seal 6. The outer part of glass seal 6 preferably is further covered by an epoxy pellet 7. An inert gas may be introduced into casing 2 in order to set the dielectric value and the pressure of the atmosphere inside the casing 2 at a preselected value.

Figure 2A:
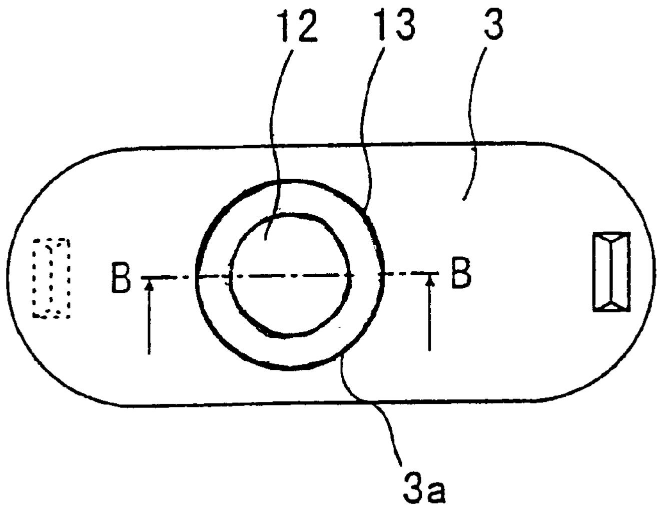
FIG. 2(*a*) is a front elevational view showing a connective pin member fixed to the support member according to the first embodiment of the invention.
Figure 2B:
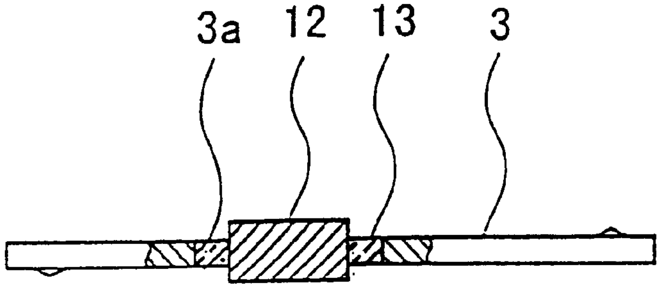

A connective pin member 12 preferably in the shape of a cylinder, made of stainless steel, to cite an example, extends through support member 3 approximately at its center, preferably extending beyond the planes in which the opposed face surfaces lie, as best shown in FIG. 2(*b*). Connective pin member 12 is fixed to the inner wall of a cylindrically shaped aperture 3*a* that has been formed in the support member 3 by using suitable sealing material made of an electrically insulating material such as glass or ceramic, for example, thereby making it possible for connective pin member 12 and support member 3 to be electrically isolated from each other. To fixedly attach connective pin member 12 to support member 3, a ring-shaped glass pellet and connective pin member 12 can be placed in hole 3*a* of support member 3 and heated to a temperature of 700 degrees centigrade, for example, while held in the described position. Cooling is then effected after melting of the glass pellets. In the described arrangement, the thermal expansion coefficient of connective pin member 12 is selected so that it is somewhat higher than the thermal expansion coefficient of support member 3.

On one side or face surface (the lower side in FIG. 1(*b*)) of the support member 3, a dished thermostatic disc such as bimetal disc 8 made of a plate formed by bonding layers of steel and copper, for example, is provided. In this case, a slug 9 is fixed at one of the ends of the bimetal disc 8 and, at the same time, this slug is fixed to the connective pin member 12, thereby making it possible for the bimetal disc 8 to be supported in such a fashion as to snap between oppositely dished configurations. A movable contact 10 is fixed at a free distal end of bimetal disc 8, i.e., at a location which is removed from slug 9 on the lower surface of the disc as seen in FIG. 1(*b*).

Figure 3A:
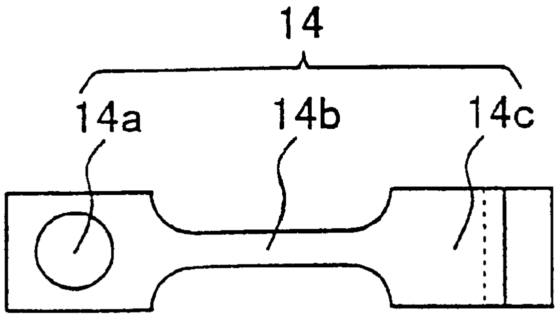
FIG. 3(*a*) is a front elevational view showing an example of the fuse terminal used in the first embodiment of this invention.
Figure 3B:
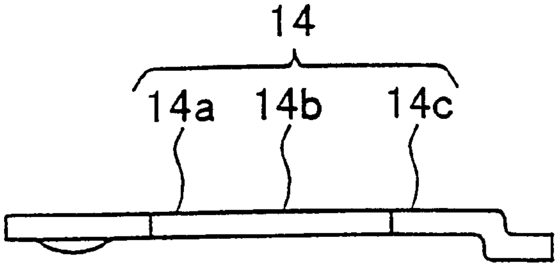

A stationary contact 11 is mounted on the inner wall of casing 2 at a location aligned with movable contact 10 of bimetal disc 8 so that movable contact 10 can move into and out of electrical engagement with stationary contact 11 in conformity with the snap action of bimetal disc 8. On the other face surface (the upper surface in FIG. 1(*b*)) of support member 3, a longitudinally extending fuse terminal (second switch) 14 made of suitable fusing metal material of low resistance such as a copper alloy, for example, is provided. Terminal portions 14*a* and 14*c* are formed at opposite ends in the longitudinal direction as is shown in FIGS. 3(*a*) and 3(*b*), and a meltable portion 14*b* is integrally formed between terminal portions 14*a* and 14*c*. Meltable portion 14*b* is formed to extend in an oblong configuration by pressing, for example, between terminal portion 14*a* and terminal portion 14*c*, with the cross-sectional area being made smaller than the cross-sectional area of each of the terminal portions 14*a* and 14*c*. One terminal portion 14*a*of the fuse terminal 14 is fixed to connective pin member 12 mounted on support member 3 as shown in FIGS. 1(*a*) and 1(*b*) and, the other terminal portion 14*c* of fuse terminal 14 is fixed to one of the terminals of support member 3, by welding, for example, in both cases.

In the motor protector made according to this embodiment, electric current flows from terminal pin 4 to fuse terminal 14 through support member 3 as shown in FIGS. 1(*b*) and 1(*d*) and, moreover, through connective terminal member 12, through movable contact 10 of bimetal disc 8, stationary contact 11 and casing 2, by means of a series electrical current path.

In FIG. 1(*d*), connective pin member 12, on the electrical side of the casing 2, is connected to the windings 51 (main winding 51 a and auxiliary winding 51*b*) of the rotor (not shown in the drawing) of the motor, for example, and on the electrical side of the terminal pin member 4, is connected to an alternating current power source 52, thereby connecting motor protector 1 in series with the driving circuit 30 of electromotive compressor 50. It is mentioned in this connection that reference number 53 in FIG. 1(*d*) indicates a capacitor used for motor starting purposes.

In a motor protector made according to this embodiment, if melting and welding develops between movable contact 10 of bimetal disc 8 and stationary contact 11, a large electric current would be generated if coil 51 of electromotive compressor 50 becomes short-circuited. However, in such case, fuse terminal 14 will be destroyed by melting, the driving circuit 30 of the electromotive compressor 50 is shut off and electromotive compressor 50 is de-energized. Accordingly, damage to the electromotive compressor 50 and destruction of the sealed terminal and the like are prevented, thereby making it possible to avoid having adhesion of carbide to the vicinity of the sealed terminal. According to this embodiment, melting of the glass part induced from the tracking phenomenon that stems from loss of electrical insulative characteristics of the glass seal 6 is avoided along with the possible blow-out of the fusite pin due to an elevated pressure level inside the electromotive compressor 50, thereby making it possible to ultimately avoid a dangerous state. Further, fuse terminal 14 is provided inside sealed casing 2 so that there is no adverse affect on the various environments of the electromotive compressor 50 by the arc that is generated when the fuse terminal 14 is melted and destroyed. Thus, motor protector 1 can be produced easily in a simple construction without drastically modifying the basic construction of conventional motor protectors (such as casing 2, support member 3, terminal pin 4, bimetal disc 8, and the like). Support member 3 which functions as a heater and fuse terminal 14 are connected in series in the current path, thereby making it possible for the atmospheric temperature inside the casing to increase by the heat generated by the heater, so that it becomes possible to adjust the characteristics of the motor protector in the optimal state by properly selecting the material of the heater and the temperature responsive characteristics. Bimetal disc 8 and fuse terminal 14 are connected via a connective pin member 12 that extends through but is electrically isolated from support member 3, thereby making it possible for the heat to be fully generated by employing the heating function of support member 3 as a whole and to easily adjust the suitable characteristics.

Figure 4A:
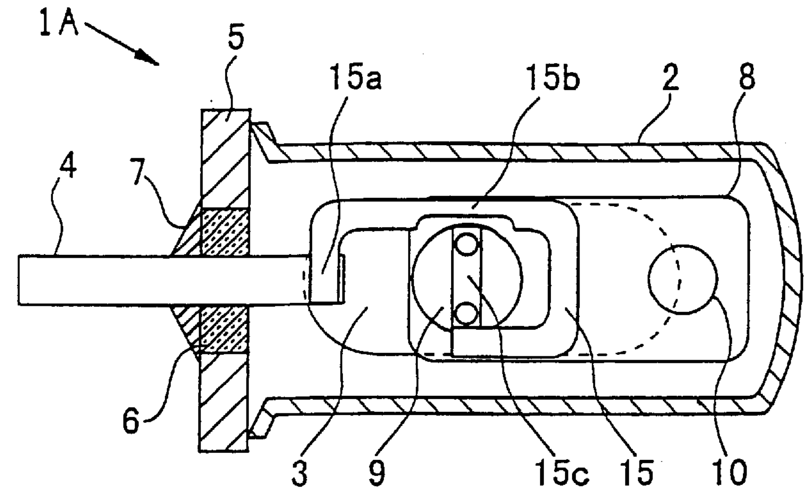
FIG. 4(*a*) is a cross-sectional front elevational view showing the inner construction of a motor protector according to a second embodiment of the invention.
Figure 4B:
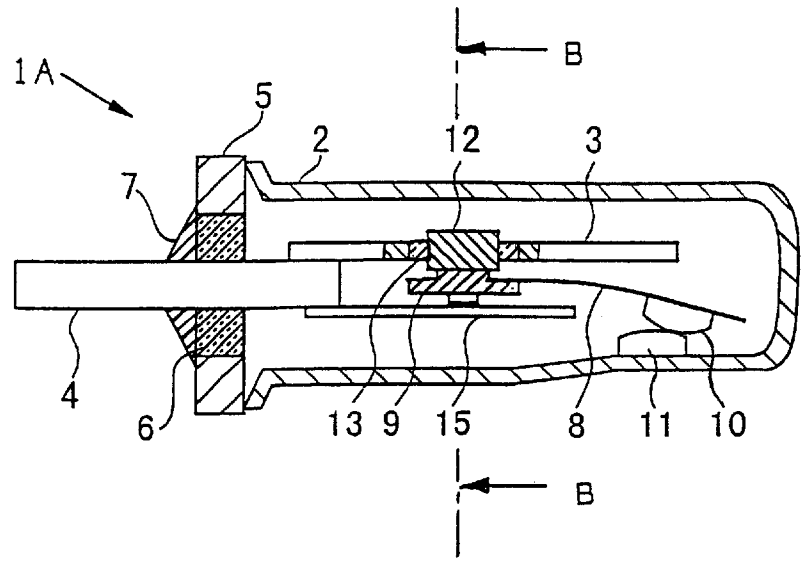
Figure 4C:
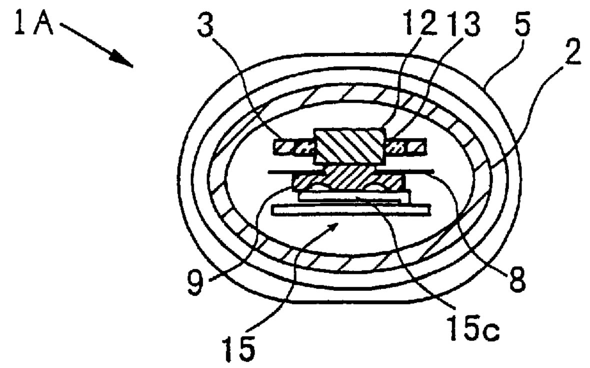

FIGS. 4(*a*)–4(*c*), 5(*a*) and 5(*b*) show a motor protector and parts thereof made in accordance with a second embodiment of the invention. The following explanation will be given using the same reference characters for those parts that correspond to the previously described embodiment. As shown in FIGS. 4(*a*) through 4(*c*), motor protector 1A made according to this embodiment is different from the first embodiment insofar as fuse terminal 15 is provided on the same side of support member 3 as bimetal disc 8. As shown in FIGS. 5(*a*) and 5(*b*), fuse terminal 15 in this embodiment is made of the same material as fuse terminal 14 in the first above-described embodiment. It is formed in the shape of a discontinuous ring, with terminal portions 15*a* and 15*c* being provided at opposite ends thereof. One terminal portion 15*a* of fuse terminal 15 is fixed by means of welding or the like to terminal pin 4 and the other terminal portion 15*c* is fixed to slug 9 also by means of welding or the like, thereby serially connecting fuse terminal 15 to terminal pin 4 and bimetal disc 4. A meltable portion 15*b* is formed by reducing the cross-sectional area of its center to such an extent that it is smaller than the cross-sectional area of the terminal portions 15*a* and 15*c*.

In motor protector 1A made according to this embodiment, a series electric current path is formed so that electric current flows from terminal pin 4 to fuse terminal 15, bimetal disc 8, movable contact 10, stationary contact 11 and casing 2. Support member 3 is used for the purpose of supporting bimetal disc 8 and is so constructed that bimetal disc 8 may be actuated by the heat generated by the fuse terminal 15 itself. According to this embodiment, it becomes possible to prevent the possible burning of electromotive compressor 50 and damage to the sealed terminal of the protector and the like as in the case of the above described embodiment, thereby making it possible to ultimately avoid a dangerous state. Fuse terminal 15 is provided on the same side of support member 3 as bimetal disc 8, thereby making it possible to obtain sufficient distance vis-a-vis the inner wall of the casing 2. Accordingly, there will be an increase in design flexibility and it becomes possible to prevent fuse terminal 15 from becoming short-circuited by contacting the inner wall of the casing 2 due to a deformation in connection with the melting process. Otherwise, the description is the same as in the case of the above embodiment. Accordingly, a repetition of the details will be omitted.

According to the invention, it becomes possible to suitably change the shape of the fuse terminal, that is, the second switch, in conformity with the motor to be protected, and the like, and the value of the calibrated electric current. Below, examples of a fuse terminal which can be used in the motor 30 protector of this invention will be explained by referring to FIGS. 6(*a*) through 8(*b*).

As shown in FIGS. 6(*a*) and 6(*b*), fuse terminal 141 in this embodiment can be formed by providing a notch cut on both sides between the terminal portions 141*a* and 141*c* at opposite ends, thereby making it possible for the cross-sectional area of the meltable portion 141 b to become smaller than the cross-sectional area of the terminal portions 141*a* and 141*c*. Fuse terminal 141 of this embodiment makes is possible to easily carry out an adjustment of the electrical isolation distance to the casing after melting and the melting time as compared with the fuse terminal 14 shown in FIGS. 3(*a*) and 3(*b*).

It is also possible to provide a plurality (such as two) of meltable portions 142*b* whose form is the same as the meltable portion 141*b* of fuse terminal 14 between the terminal portions 142*a* and 142*c* as in the case of fuse terminal 142 shown in FIGS. 7(*a*) and 7(*b*). Melting takes place more easily than in the case of fuse terminal 141 in the above embodiment by providing a plurality of meltable portions 142*c*. Accordingly, it becomes possible to obtain motor protectors of various properties with different melting temperatures by providing the meltable portions in conformity with the motor to be protected.

Figure 8A:
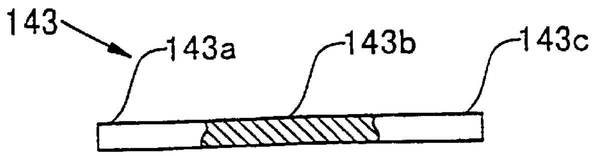
FIG. 8(*a*) is a partial cross-section showing still another embodiment of a fuse terminal which can be used in the invention.
Figure 8B:
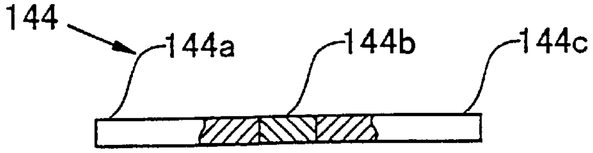
Figure 9A:
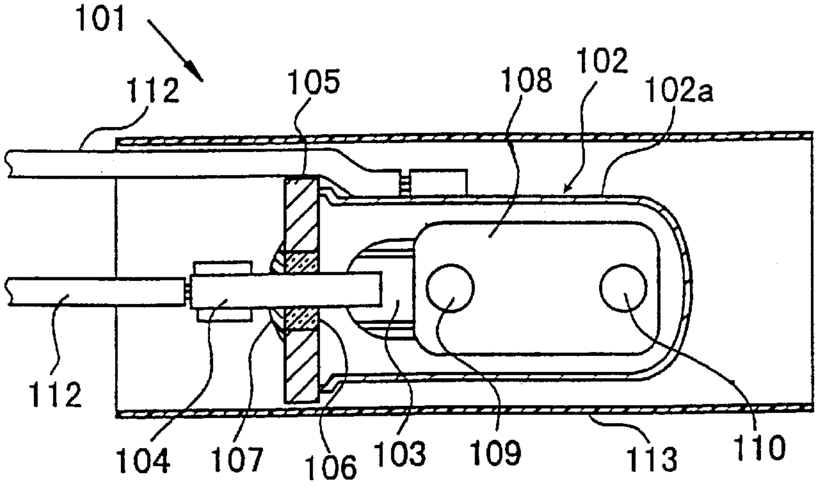
FIG. 9(*a*) is a cross-sectional front elevational view showing the inner construction of a motor protector according to the prior art.
Figure 9B:
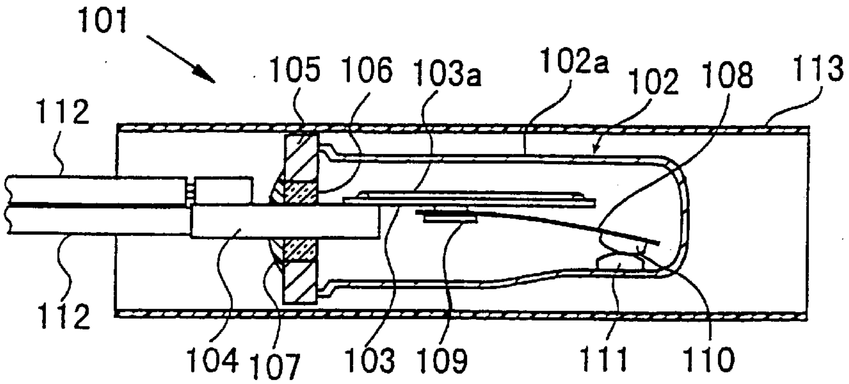
Figure 9C:
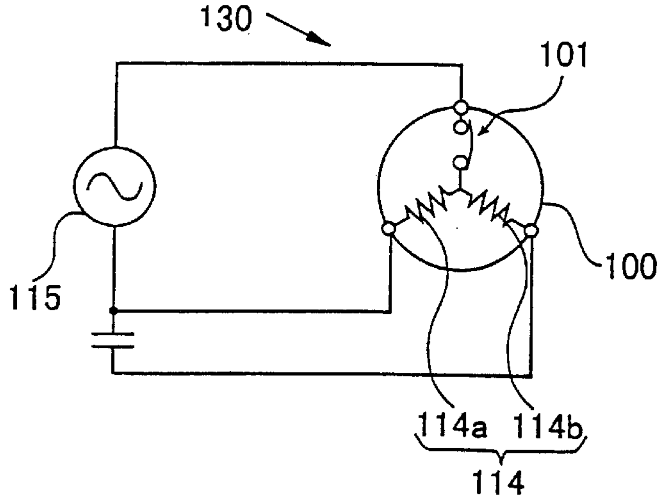

FIGS. 8(*a*) and 8(*b*) are partial cross-sectional views showing still other embodiments of the fuse terminal that can be used in this invention. Fuse terminals 143 and 144 in these embodiments are formed in a longitudinal form, with the terminal portions 143*a*, 144*a* and 143*c*, 144*c* at opposite ends being fixed to the respective terminal pin 4 and slug 9 by means of welding or the like. Fuse terminal 143 shown in FIG. 8(*a*) is integrally formed by using fusion material which is the same as in the various examples described above. In this case, the center of the fuse terminal 143 becomes the meltable portion 143*b*. Preparation is facilitated compared with the above-described fuse terminals 14, 15, 141 and 142. This is more advantageous from the standpoint of cost of metal molds and materials used for the fuse terminal. In the case of the fuse terminal 144 shown in FIG. 8(*b*), on the other hand, the meltable portion 144*b*, made of the same fusing material as in the various examples described above, is fixed by welding or the like in such a manner as to be sandwiched by the terminal portions 144*a* and 144*c* which are made of material of low electrical resistance. According to fuse terminal 144 of this embodiment, it is possible to melt and separate at a desired location and to obtain motor protectors of various characteristics by changing the size of the electric current that flows to the melt portion 144*b*.

The invention is not restricted to the forms of the above-mentioned embodiment and can be changed in various ways. For example, the fuse terminals which are shown in FIGS. 6 through 8 can be used in any of the forms of the above-mentioned first and second embodiments. In addition, it becomes possible to provide an electrically insulative part on the inner wall of the casing and on the surface of the backside support member, by way of example, to prevent short-circuiting by the fuse terminal that has been melted and separated. According to the invention described above, it becomes possible to offer a motor protector which is capable of ultimately avoiding a dangerous state even when melting and welding occurs between the contacts. According to the invention, moreover, it becomes possible to offer a motor protector which is capable of preventing any adverse affect upon the various environments of the electromotive compressor by the arc that is generated at the time of a de-energization of the driving circuit.

It will be understood that the invention includes all modifications and equivalents of the described embodiments falling within the scope of the appended claims.

What is claimed:

1. Motor protector apparatus comprising:

a generally tubular electrically conductive casing having an open end, an electrically conductive header attached to and closing the open end of the casing, the header having a bore and mounting an electrically conductive terminal pin in the bore electrically isolated from the header, the pin having a distal end disposed within the casing, an electrically conductive support member having first and second ends, the first end of the support member attached to the distal end of the terminal pin, an electrically conductive connective member, the connective member mounted on the support member but electrically isolated therefrom, a first switch comprising a snap-acting thermostatic disc movable between first and second oppositely dished configurations and having two spaced apart end portions, one end portion being fixedly attached to the connective member and the other end portion movable into and out of electrical engagement with the casing, and a second switch comprising a fuse member disposed within the casing serially connected to the first switch.

2. Motor protector apparatus according to claim 1 in which the support member is configured as a plate having two opposed face surfaces, the fuse member being disposed on one opposed face surface and the snap-acting disc being disposed on the other opposed face surface.

3. Motor protector apparatus according to claim 1 in which the support member has two opposed face surfaces, the fuse member and the snap-acting disc being disposed on the same opposed face surface.

4. Motor protector apparatus according to claim 1 in which the fuse member is configured as a discontinuous ring.

5. Motor protector apparatus according to claim 1 in which the support member is formed with an aperture and the connective member is a pin held electrically isolated from the support member by electrically insulative glass material.

6. Motor protector apparatus according to claim 1 in which the fuse member is elongated having an attenuated portion disposed intermediate the spaced apart end portions.

7. Motor protector apparatus according to claim 6 in which the attenuated portion comprises a pair of aligned notches.

8. Motor protector apparatus according to claim 6 in which the attenuated portion comprises a plurality of pairs of aligned notches.

9. Motor protector apparatus according to claim 1 in which the fuse member has spaced apart end portions of relatively high electrically conductive material connected to a relatively low electrically conductive intermediate portion.

10. Motor protector apparatus according to claim 5 in which the support member has two opposed face surfaces lying in respective planes and the connective member extends beyond each respective plane.

11. Motor protector apparatus according to claim 1 in which the fuse member has two spaced apart end portions, one end portion of the fuse member being attached to the connective member in electrically conductive relation therewith and the other end portion being connected to the support member in electrically conductive relation therewith.

12. Motor protector apparatus according to claim 1 in which the fuse member has two spaced apart end portions, one end portion of the fuse member being attached to the fixed end portion of the snap-acting thermostatic disc in electrically conductive relation therewith and the other end portion connected to the distal end of the terminal pin in electrically conductive relation therewith.

13. A motor protector characterized in that it comprises a casing which can be tightly sealed providing a switch cavity, said switch cavity containing a support member with an electrically conductive connective member mounted on the support member but electrically isolated therefrom, a first switch which includes a snap-acting disc carrying a movable contact for switching of an electric current path as the disc snaps in response to a selected electric current and the ambient temperature, and a second switch which is connected in series with the first switch and is disposed inside of the casing and which opens the current path as it is melted by a predetermined overflow of electric current.

14. A motor protector as described in claim 13, characterized in that a heater which generates heat in response to the level of electric current flowing therethrough is connected in series with the electric current path.

15. A motor protector as described in claim 14, characterized in that the support member serves as the heater for the second switch.

16. A motor protector as described in claim 14, characterized in that the first and second switches are connected through the connective member which extends through the support member, said support member having the function of a heater.

17. A motor protector as described in claim 13, characterized in that first switch is supported on a side of the support member and at the same time, said second switch is arranged on another side of the support member.

18. A motor protector as described in claim 13, characterized in that the second switch has a member with a meltable part which has been formed by partially reducing the cross-sectional area of the member.

19. A motor protector as described in claim 17, characterized in that the meltable portion of the second switch is formed by providing a notch cut on the side of a plate member.

20. A motor protector as described in claim 19, characterized in that second switch has a plurality of meltable portions that have been formed at selected intervals.

* * * * *